(12) United States Patent
Clancy

(10) Patent No.: US 11,198,086 B2
(45) Date of Patent: Dec. 14, 2021

(54) SYSTEMS AND METHODS OF EMPLOYING HEPA AIR UNITS AS SECONDARY AIR FILTERS

(71) Applicant: Dove Clancy, San Diego, CA (US)

(72) Inventor: Dove Clancy, San Diego, CA (US)

( * ) Notice: Subject to any disclaimer, the term of this patent is extended or adjusted under 35 U.S.C. 154(b) by 220 days.

(21) Appl. No.: 16/506,057

(22) Filed: Jul. 9, 2019

(65) Prior Publication Data

US 2021/0008479 A1 Jan. 14, 2021

(51) Int. Cl.
| | |
|---|---|
| *B01D 46/00* | (2006.01) |
| *F24F 3/167* | (2021.01) |
| *F24F 8/108* | (2021.01) |
| *F24F 8/158* | (2021.01) |

(52) U.S. Cl.
CPC ..... *B01D 46/0026* (2013.01); *B01D 46/0002* (2013.01); *F24F 3/167* (2021.01); *F24F 8/108* (2021.01); *F24F 8/158* (2021.01)

(58) Field of Classification Search
CPC . B01D 46/0002; B01D 46/0026; F24F 3/167; F24F 8/108; F24F 8/158
USPC ...... 55/356, 385.2, 471–473, 467, 485, 486, 55/350.1, DIG. 18; 95/287, 288; 454/187
See application file for complete search history.

(56) References Cited

U.S. PATENT DOCUMENTS

| | | | | |
|---|---|---|---|---|
| 3,505,989 A | * | 4/1970 | Truhan | A61G 10/005 600/21 |
| 5,069,691 A | * | 12/1991 | Travis | A47L 5/38 96/57 |
| 5,591,244 A | * | 1/1997 | Vross | B01D 46/00 454/65 |
| 5,626,820 A | * | 5/1997 | Kinkead | F24F 3/167 422/122 |
| 6,395,047 B1 | * | 5/2002 | Smith | B08B 15/002 55/385.2 |
| 6,402,613 B1 | * | 6/2002 | Teagle | F04D 19/002 454/195 |
| 6,616,720 B1 | * | 9/2003 | Smith | B08B 15/04 55/385.2 |
| 6,979,359 B2 | * | 12/2005 | Laiti | B01D 46/0023 55/356 |
| 7,662,198 B2 | * | 2/2010 | Jansen | A47L 9/19 55/337 |
| 2003/0110946 A1 | * | 6/2003 | Lehman | B01D 53/0407 95/273 |

(Continued)

*Primary Examiner* — Minh Chau T Pham
(74) *Attorney, Agent, or Firm* — Buche & Associates, P.C.; John K. Buche; Bryce A. Johnson

(57) ABSTRACT

Disclosed is a method of filtering air in a closed work environment that includes placing a primary air filter assembly in the closed work environment, where the primary air filter assembly includes a first air input and a first air output. The first air output is poised to emit once-filtered air outside the closed work environment. The method also includes placing a secondary air filter assembly in the closed work environment, where the secondary air filter assembly includes a second air input and a second air output. The method continues with repositioning the first air output to feed the second air input of the secondary air filter assembly, where the second air output is positioned to provide twice-filtered air to the closed work environment, and operating the primary air filter assembly and the secondary air filter assembly simultaneously.

9 Claims, 8 Drawing Sheets

(56) References Cited

U.S. PATENT DOCUMENTS

2008/0282652 A1\* 11/2008 Wardlaw .................. F16P 1/06
                                                      55/385.2

\* cited by examiner

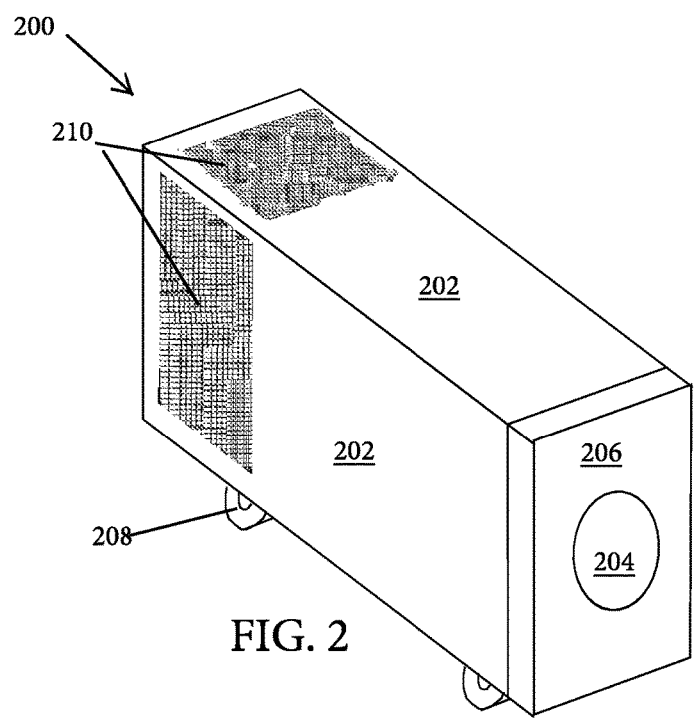
FIG. 2
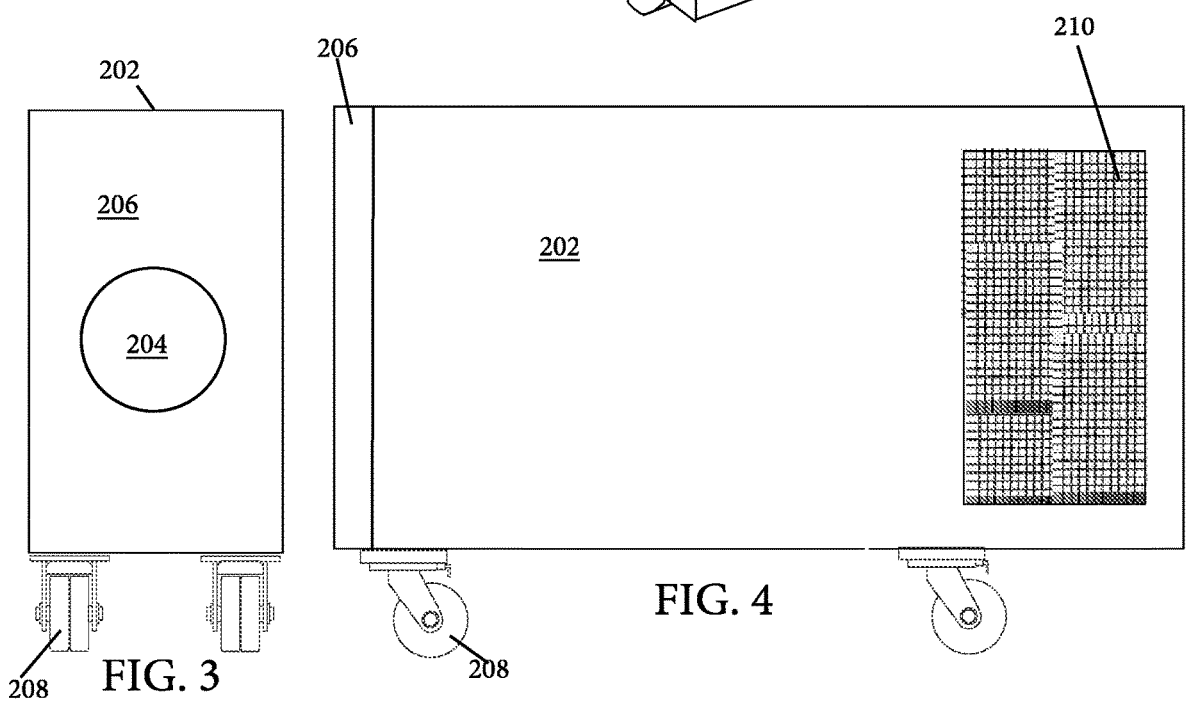
FIG. 3
FIG. 4

SYSTEMS AND METHODS OF EMPLOYING HEPA AIR UNITS AS SECONDARY AIR FILTERS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of air filtration, specifically negative pressure high efficiency particulate air (HEPA) air filtering in a work environment for the control of asbestos and particulate matter.

Background of the Invention

In a work environment as found at construction sites, hospital clean rooms, manufacturing facilities, and the like, there is a need for removing hazardous asbestos, dust, bacteria, and other particulates from the ambient air. Typically, a work area is sealed off from the outside environment and an air filter assembly is placed within, with the exhaust air being ducted to outside the area.

U.S. Government regulations, issued by the Centers For Disease Control (CDC), require that work in sensitive areas, such as repair or construction work in hospitals, pharmacies, prisons, and the like be monitored and controlled. Particulates, such as asbestos or other contaminants, that can be potentially disturbed during construction or renovation require control barriers to prevent the spread of contamination via air currents. These controls include maintaining a negative pressure environment throughout the work area for the duration of the work, and using an "exhaust to outside" rule where filtered air must be ducted to outside the building during construction and repairs.

Ducting the filtered air outside the work area requires filtered air to be ducted a significant distance away from the work area to exit the building. Extensive ducting of filtered air is expensive, time-consuming, and often impractical. Ducting is also unrealistic for interior rooms of a large facility, causing increased labor costs and inconvenience for personnel in nearby spaces. Ducting air to outside the building can also dislodge debris in a ceiling during installation and can contaminate additional areas. Therefore, there is a need to provide HEPA filtering of a closed room without the need to duct the filtered air out of the building.

SUMMARY OF THE INVENTION

In view of the foregoing, an object of this specification is to disclose a method of filtering air in a closed work environment that includes placing a primary air filter assembly in the closed work environment, where the primary air filter assembly includes a first air input and a first air output. The first air output is poised to emit once-filtered air outside the closed work environment. The method also includes placing a secondary air filter assembly in the closed work environment, where the secondary air filter assembly includes a second air input and a second air output. The method continues with repositioning the first air output to feed the second air input of the secondary air filter assembly, where the second air output is positioned to provide twice-HEPA filtered air to the closed work environment, and operating the primary air filter assembly and the secondary air filter assembly simultaneously.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which:

FIG. 2 illustrates an isometric view of a first air filter assembly;

FIGS. 3 and 4 illustrates side and top views of the air filter assembly disclosed in FIG. 2;

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed is a method of filtering air in a closed work environment that includes placing a primary air filter assembly in the closed work environment, where the primary air filter assembly includes a first air input and a first air output. The first air output is poised to emit once-filtered air outside the closed work environment. The method also includes placing a secondary air filter assembly in the closed work environment, where the secondary air filter assembly includes a second air input and a second air output. The method continues with repositioning the first air output to feed the second air input of the secondary air filter assembly, where the second air output is positioned to provide twice-filtered air to the closed work environment, and operating the primary air filter assembly and the secondary air filter assembly simultaneously.

Figure 1:
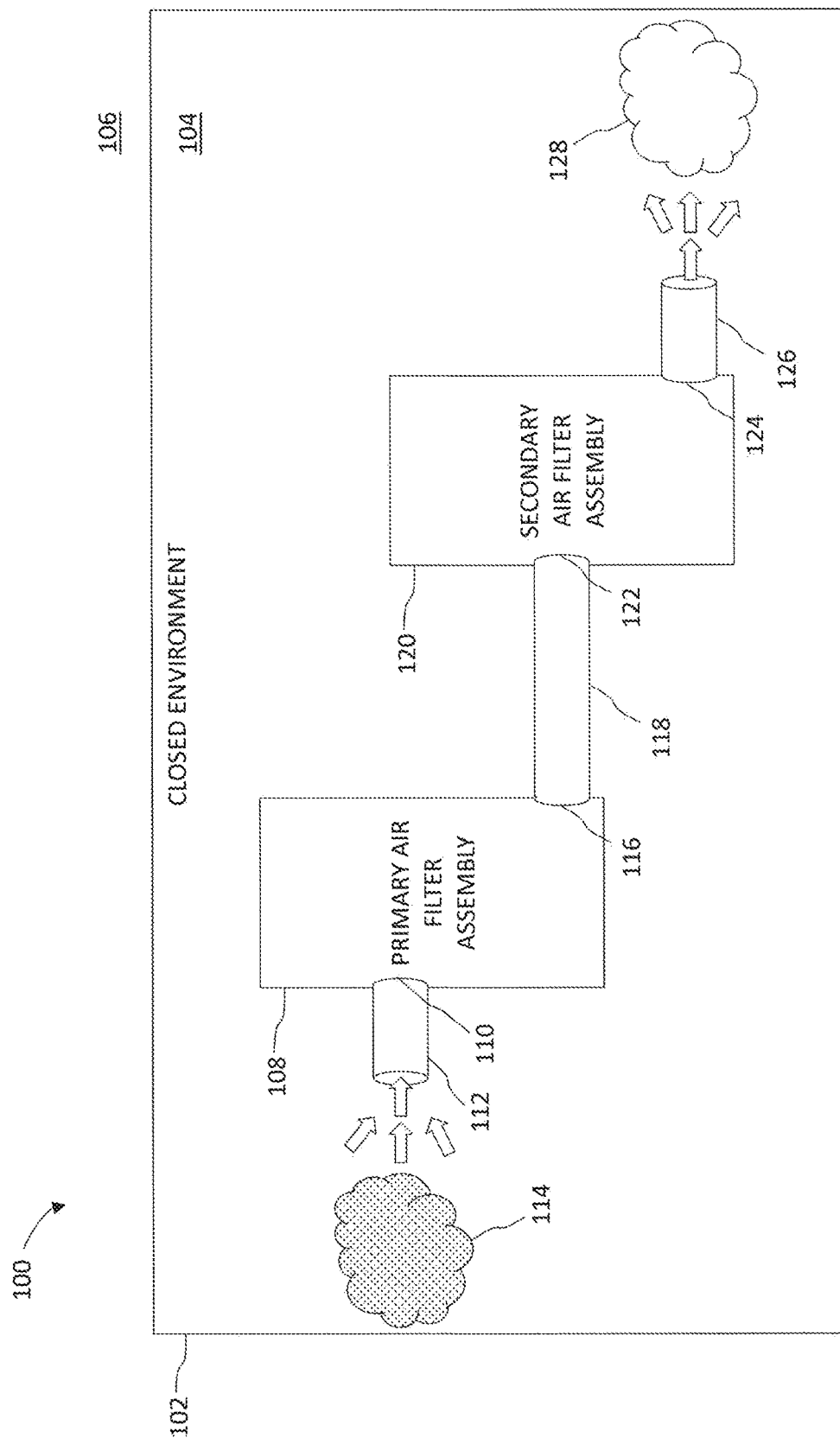
FIG. 1 illustrates a system block diagram of an air filtration system in a closed environment using a primary filtration assembly and a secondary filtration assembly attached to the output of the primary filtration assembly.
Figure 5:
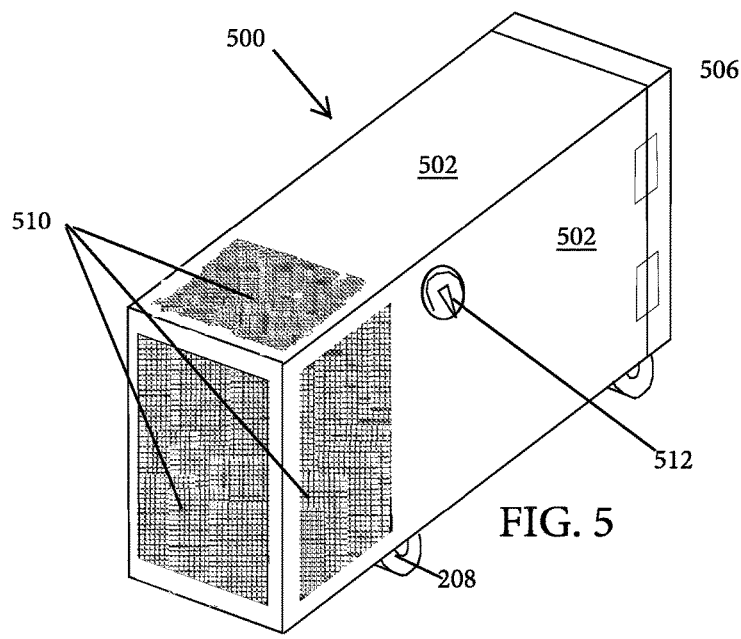
FIGS. 5-8 illustrates isometric, side, and top views of a second air filter assembly with a water column gauge.
Figure 6:
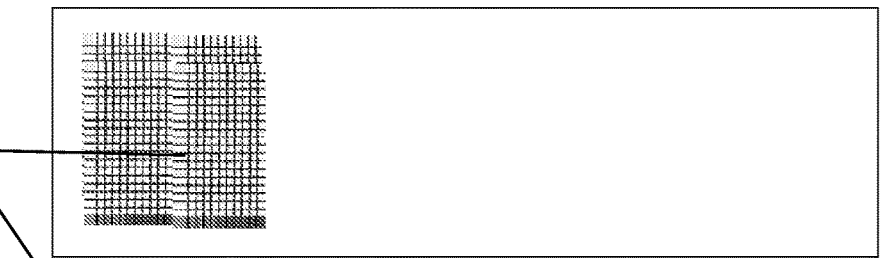
Figures 7, 8:
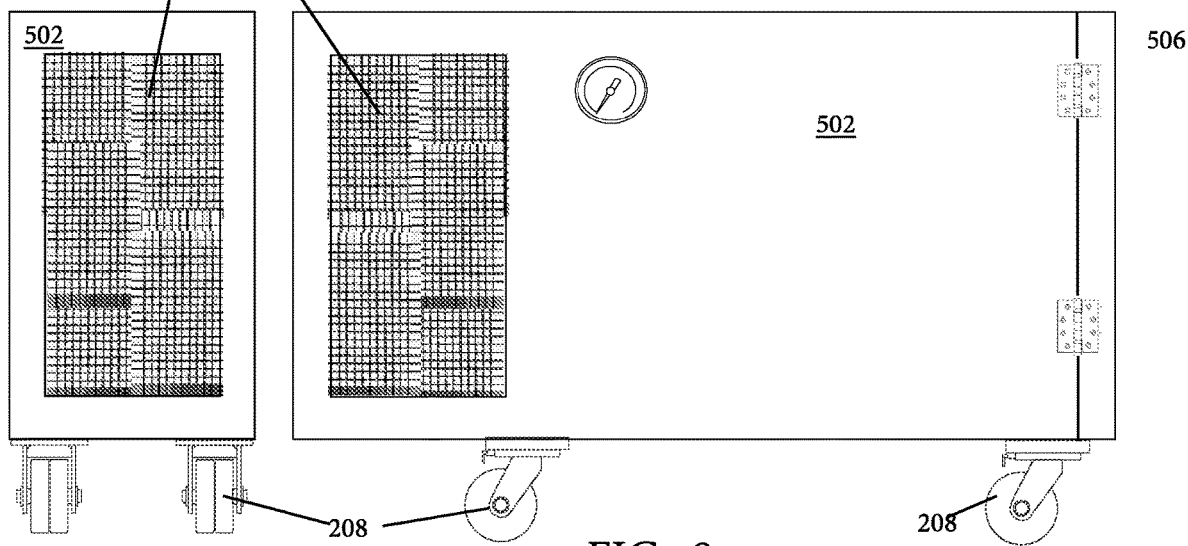

FIG. 1 illustrates a system block diagram of an air filtration system 100 in a closed environment 102 using a primary filtration assembly 108 and a secondary filtration assembly 120, where a secondary input 122 of the secondary filtration assembly 120 is attached to a primary output 116 of the primary filtration assembly 108. In some embodiments, the closed environment 102 is within a building or structure and contains a closed environment atmosphere (atmosphere) 104 that is contaminated with particulates such as construction dust, smoke, bacteria, asbestos particles, and the like which are harmful to occupants of the building. A region of outside atmosphere 106 is also shown for comparison. The air filtration system 100 includes a first duct 112 that accepts unfiltered air 114 from the atmosphere 104 and routes the unfiltered air 114 to an input 110 of the primary air filtration assembly 108. The air filtration system 100 also includes a second duct 118 that connects the primary output 116 to a secondary input 122 of the secondary filtration assembly 120, whereby partially- or first-filtered air from the primary filtration assembly 108 is routed to the secondary filtration system 120. The air filtration system 100 also includes a third duct 126 that routes twice-filtered air 128 from a secondary output 124 to the atmosphere 104. Thus configured, the air filtration system 100 provides twice-filtered air 128 to the closed work environment 102 without the need to route once-filtered air out of the closed work environment 102.

According to some embodiments, the secondary filtration assembly 120 uses a HEPA air filter to allow the twice-filtered air 128 to exit the third duct 126 within the closed work environment 102 and thus, within an occupied building, facility, or public thoroughfare without the need for extensive ducting to outside the building.

According to some embodiments, one or both primary and secondary air filter assemblies 108, 120 operate as negative pressure filters. According to some embodiments, one or both one or both primary and secondary air filter assemblies 108, 120 use HEPA or carbon filter elements.

According to some embodiments, it is advantageous to position one or both the primary and secondary air filter assemblies 108, 120 outside of the closed work environment 102. This can be due to physical constraints, cost, time, and the like. In such embodiments, it can be advantageous to redirect the flow of twice-filtered air back into the closer work environment 102.

FIG. 2 illustrates an isometric view of a first air filter assembly 200. The first air filter assembly 200 includes a first body 202, a first air flow inlet 204, a first hinged door 206, a plurality of wheels (casters) 208, and one or more first screened air outlets 210. In some embodiments, the first air flow inlet 204 is connected to flexible ductwork, such as second duct 118 of FIG. 1, and is 12 inches in diameter. However, other sizing and inlet options are possible and are not limited by this disclosure. The first air filter assembly 200 is powered by propane gas, natural gas, electricity, gasoline, and the like to filter ambient air entering the assembly 200 via the first air flow inlet 204, filtering the air using filters, chemicals, and/or centrifugal cleaners, traps and captures contaminants within the assembly 200 for later cleaning, and exhausts filtered air via the one or more first screened air outlets 210. In some embodiments, the assembly 200 is mobile and is placed into position by using the attached wheels 208, thus placing the assembly 200 in a desired position in a contaminated area of a building or construction site as described in FIG. 1.

In some embodiments, the first air filter assembly 200 performs the function of the secondary filtration assembly 120 of FIG. 1 by accepting incoming air from the primary filtration assembly 108 and exhausting twice-filtered air 128 via the screened air outlets 210. In some embodiments, the screened air outlets 210 include baffles and/or diffusers (not shown) to reduce air velocity or direct the flow of filtered air to desired directions or regions of the closed work space 102. Other embodiments are possible and are not limited by these examples.

FIGS. 3 and 4 illustrates side and top views of the first air filter assembly 200 disclosed in FIG. 2.

FIGS. 5-8 illustrates an isometric, side, and top views of a second air filter assembly 500 with a water column gauge. The second air filter assembly 500 includes a second body 502, a second hinged door 506, a plurality of wheels (casters) 208, and one or more second screened air outlets 510. The second air filter assembly 500 is similar to the first air filter assembly 200 disclose din FIG. 2 but includes the water column gauge 512 used to measure and display pressure differential between inlet and outlet pressures of the second air filter assembly 500. The water pressure gauge 500 allows an operator to monitor the relative cleanliness and efficiency of a filter. When the pressure differential increases beyond a predetermined set point, the operator knows that the filter is likely clogged and needs to be cleaned or replaced. In some embodiments, the water pressure gauge often displays the pressure differential by using a water column in units of inches wc, inches Ag, or inches H2O, a non-SI standard measurement.

In some embodiments, the second air filter assembly 500 performs the function of the secondary filtration assembly 120 of FIG. 1 by accepting incoming air from the primary filtration assembly 108 and exhausting twice-filtered air 128 via the second screened air outlets 510. In some embodiments, the second screened air outlets 510 include baffles and/or diffusers (not shown) to reduce air velocity or to direct the flow of filtered air to desired directions or regions of the closed work space 102. Other embodiments are possible and are not limited by these examples.

Figure 9:
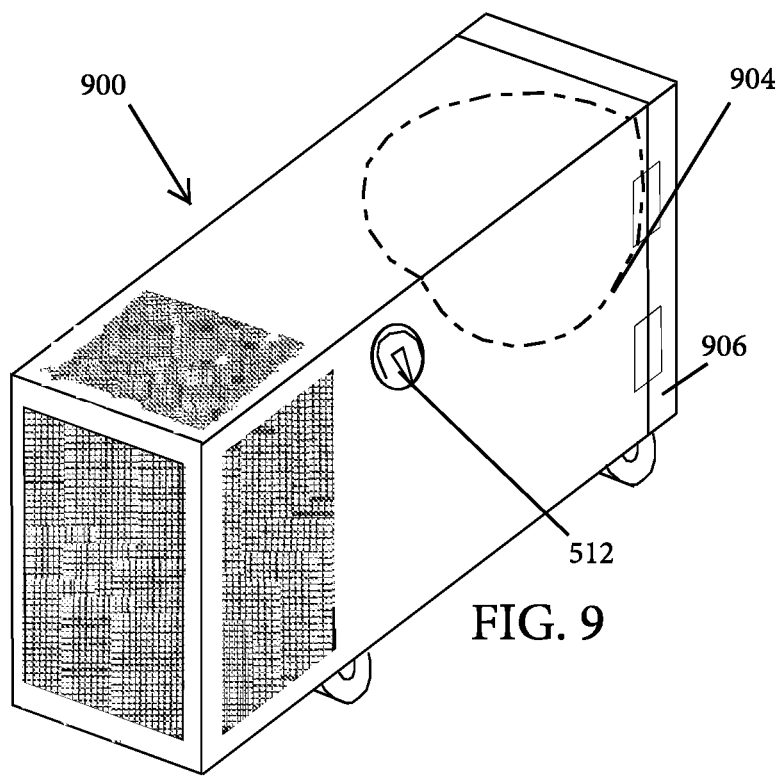
FIGS. 9 and 10 illustrate isometric views of a third air filter assembly with a circular cutaway region that uses standard and HEPA filter elements.
Figure 10:
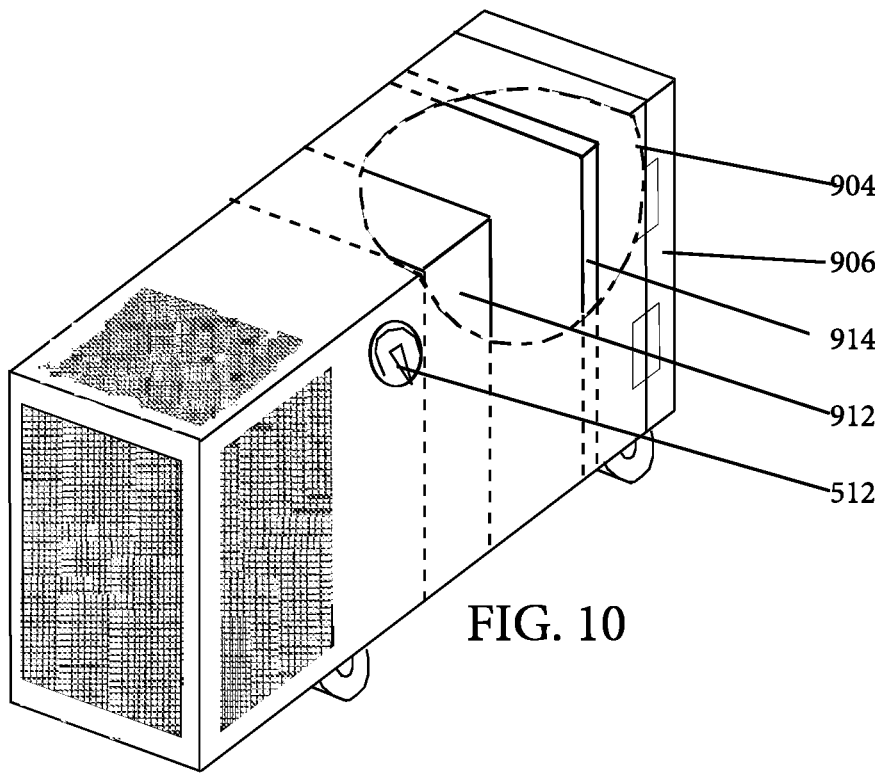

FIGS. 9 and 10 illustrate isometric views of a third air filter assembly 900 with a circular cutaway region 904 that uses standard and HEPA filter elements. The third air filter assembly 900 includes a third hinged door 906, a plurality of wheels (casters) 208, one or more third screened air outlets 910, a mechanical or paper air filter element 912, and a HEPA filter element 914. The third air filter assembly 900 is similar to the first air filter assembly 200 disclose din FIG. 2 but includes the water column gauge 512 used to measure and display pressure differential between inlet and outlet pressures of the third air filter assembly 900. In some embodiments, the third air filter assembly 900 includes one or more replacement doors (not shown) to allow access to the interior of the third air filter assembly 900 for the purpose of replacing filters 912 and/or 914. Also in some embodiments, the third air filter assembly 900 includes an air gap (not shown) between the air filter element 912 and the HEPA filter element 914. In some embodiments, the air gap is 8" or 12", but other dimensions are possible.

According to some embodiments, the third air filter assembly 900 is constructed to accept a 2' thick×24" wide×24" height filter element 912 and a 12"×24"×24" HEPA filter element 914. Other filter sizes are possible and are not limited by this disclosure. For instance, the filter could be 2' thick×24" wide×48." In some embodiments, the third screened air outlets 910 include baffles and/or diffusers (not shown) to reduce air velocity or to direct the flow of filtered air to desired directions or regions of the closed work space 102. Other embodiments are possible and are not limited by these examples.

Figure 11:
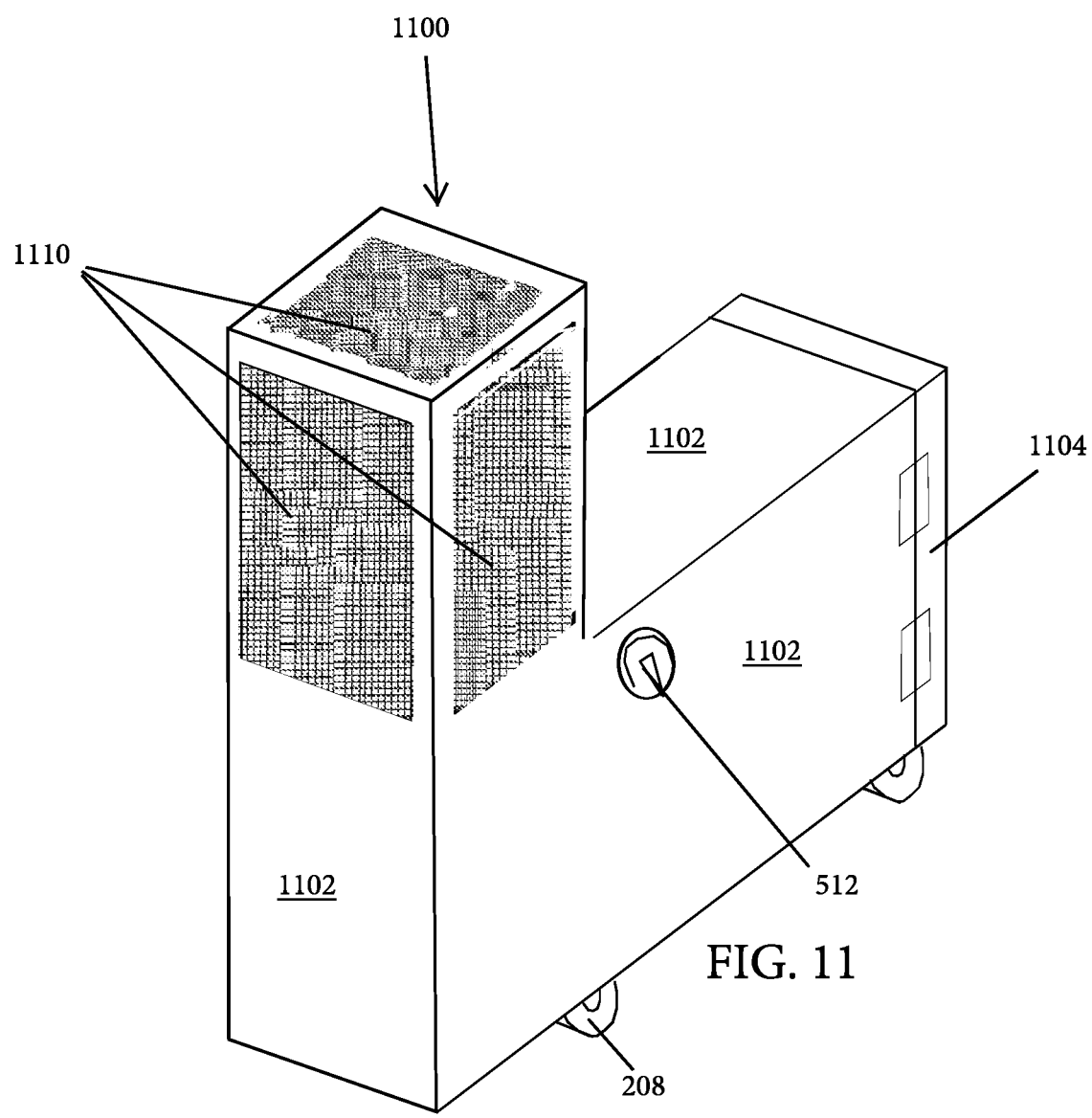
FIG. 11 illustrates an isometric view of a fourth air filter assembly with an expanded outlet area.

FIG. 11 illustrates an isometric view of a fourth air filter assembly 1100 with an expanded outlet area. The fourth air filter assembly 1100 includes a fourth body 1102, a fourth hinged door 1104, a plurality of wheels (casters) 208, and one or more fourth screened air outlets 1110. The fourth air filter assembly 1100 is similar to the first air filter assembly 200 disclose din FIG. 2 but includes the water column gauge 512 used to measure and display pressure differential between inlet and outlet pressures of the fourth air filter assembly 1100 and an expanded air outlet area. The expanded air outlet area permits the fourth air filter assembly 1110 to exhaust filtered air in multiple directions at once, including all four horizontal directions and vertically. According to some embodiments, the fourth air filter assembly 1110 uses HEPA filter elements (not shown) as disclosed earlier. In some embodiments, the fourth screened air outlets 1110 include baffles and/or diffusers (not shown) to reduce air velocity or to direct the flow of filtered air to desired directions or regions of the closed work space 102. Other embodiments are possible and are not limited by these examples.

Figure 12:
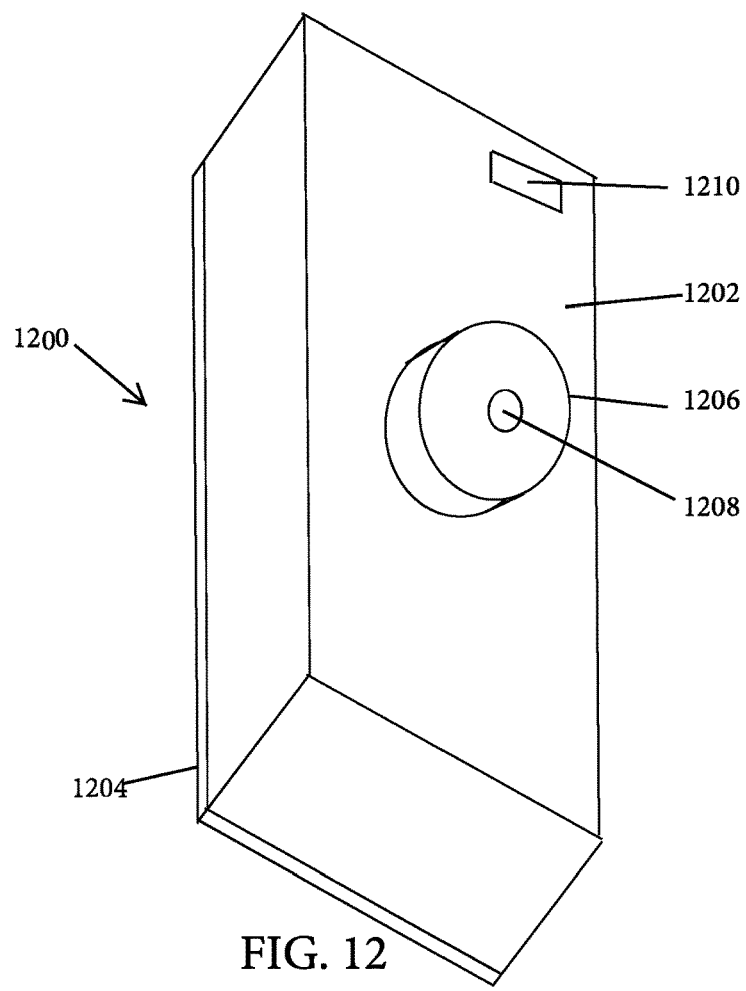
FIGS. 12-14 illustrate isometric views of a fan motor assembly.
Figure 13:
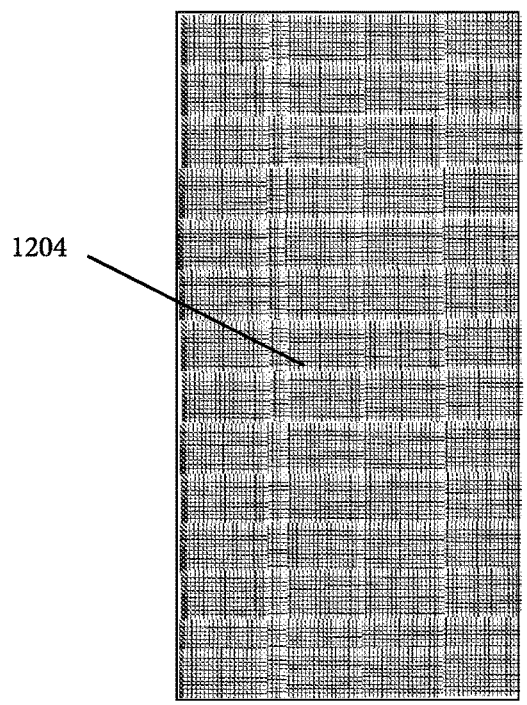
Figure 14:
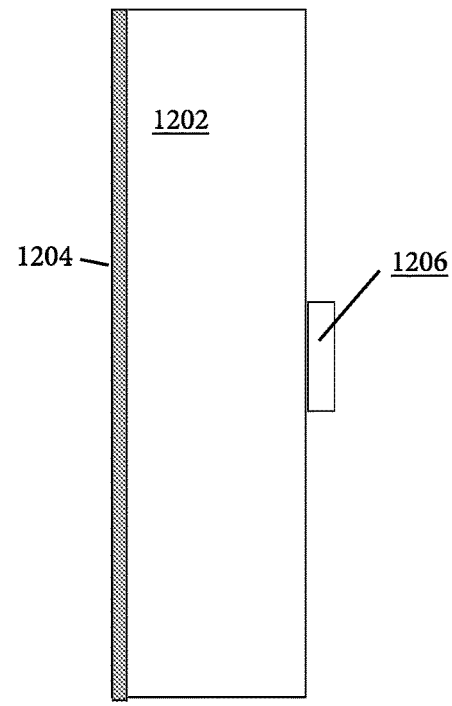

FIGS. 12-14 illustrate an isometric and side views of a fan motor assembly 1200. The fan motor assembly 1200 includes a fan motor assembly body 1202, a filter element 1204, an air inlet 1206, an inlet fan motor 1208, and a three-speed fan switch box 1210. According to some embodiments, the inlet fan motor 1208 employs a squirrel-cage type fan. In some embodiments, the filter element 1204 is a paper filter while in other embodiments, the filter element 1204 is a HEPA filter. In operation, the fan motor assembly 1200 is energized by using the three-speed fan switch box 1210 to control the speed of the fan motor 1208. Ambient air is drawn into the air inlet 1206 and passes through the filter element 1204 before being exhausted out to the closed air environment 104 of FIG. 2.

Figure 15:
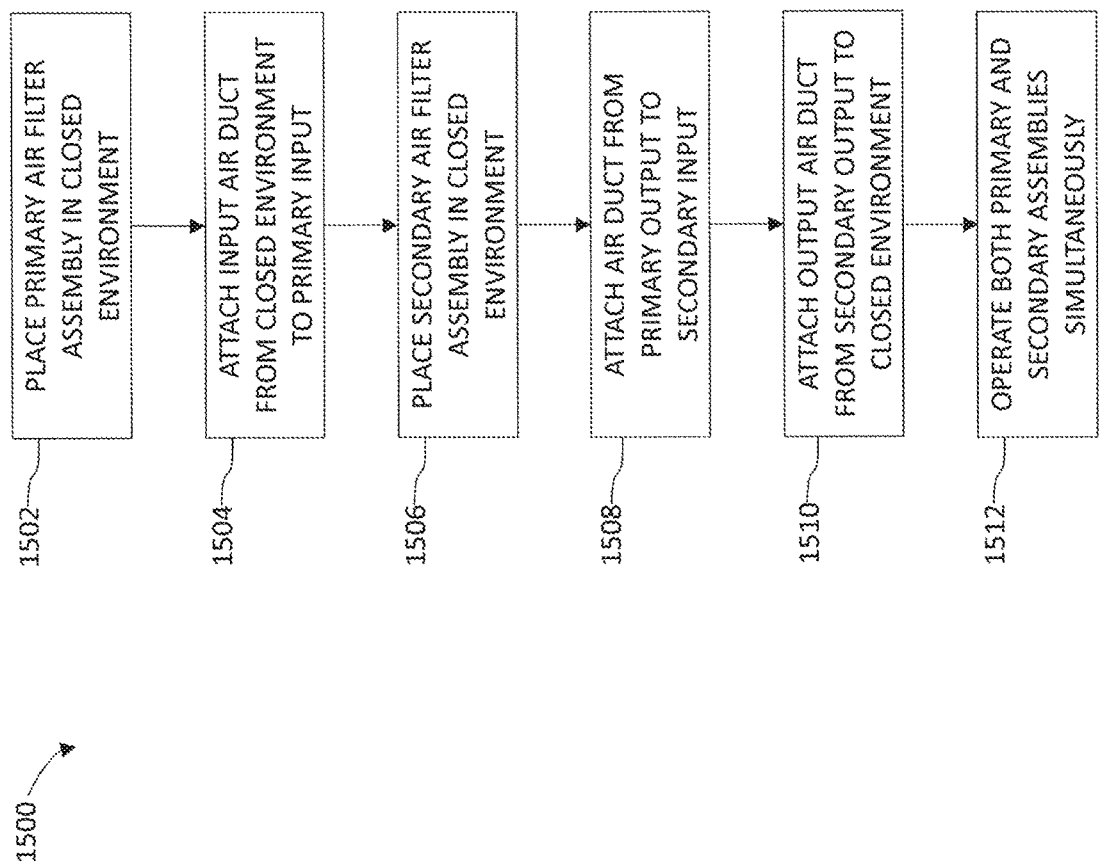
FIG. 15 illustrates a method flow diagram for filtering air in a closed area using two filtering assemblies without ducting the exhaust air outside of the closed area.

FIG. 15 illustrates a flow diagram for filtering air in a closed area method 1500 using two filtering assemblies without ducting the exhaust air outside of the closed area. The method 1500 begins at block 1502 where the primary air filter assembly is positioned in a closed work environment that requires filtering as described in FIG. 1. In some embodiments, the primary air filter assembly is the primary filtration assembly 108 of FIG. 1. Next, at block 1504, an inlet air duct, such as first duct 112, is connected to the inlet of the primary air filter assembly. The inlet air duct directs contaminated ambient air of the work site and routes the air to the primary air filter assembly for filtering.

Next, at block 1506, an additional secondary air filter assembly is placed into the closed environment in proximity to the first air filter assembly. According to some embodiments, the secondary air filter assembly is the secondary air filtration assembly 120 of FIG. 1. Next, at block 1508, the air inlet of the secondary air filter assembly is connected to the outlet of the primary air filter assembly via an air duct such as second duct 118. In this manner, first-filtered air output from the primary assembly is injected into the inlet of the secondary assembly for an additional round of filtering. Next, at block 1510, the outlet of the secondary air filter assembly is routed within the closed environment. Finally, at block 1512, both the primary and secondary air filter assemblies are operated simultaneously, thus providing twice-filtered air back to the atmosphere of the closed work environment.

Figure 16:
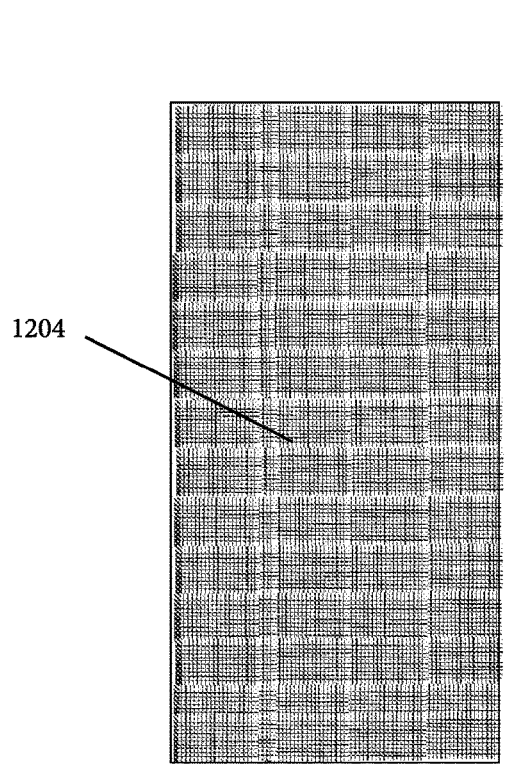
FIGS. 16-18 illustrate front and side views of a floor mounted filter assembly.
Figure 17:
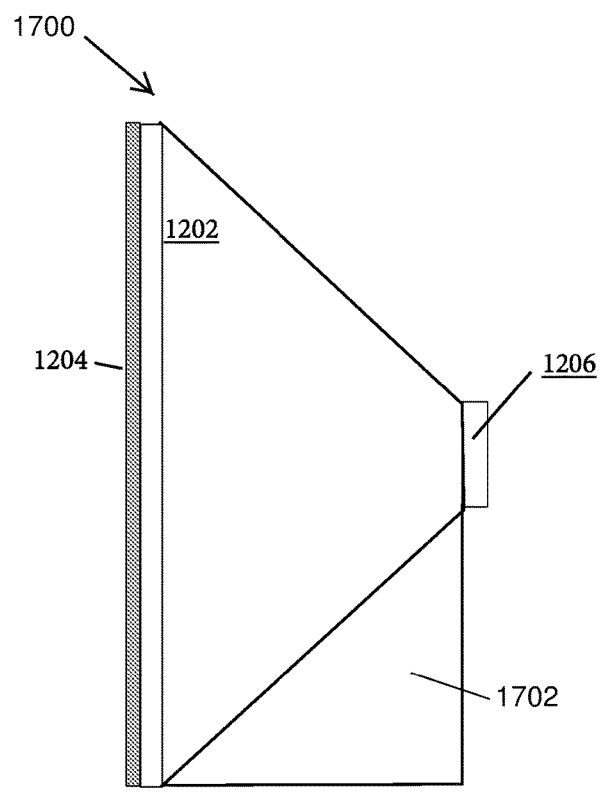
Figure 18:
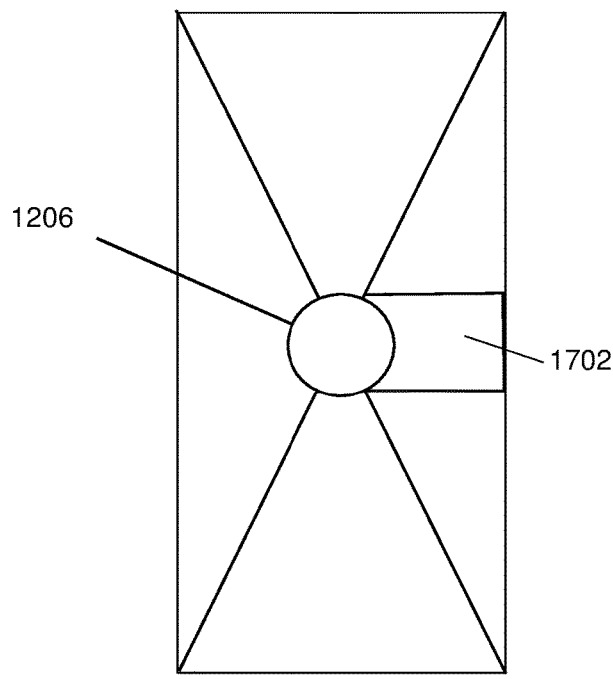

FIGS. 16-18 illustrate front and side views of a floor mounted filter assembly 1700. The floor mounted filter assembly 1700 includes a fan motor assembly body 1202, a filter element 1204, an air inlet 1206, and a floor bracket stand 1702. In some embodiments, the filter element 1204 is a paper filter while in other embodiments, the filter element 1204 is a HEPA filter. In operation, the filter assembly 1700 is positioned onto a floor or other horizontal surface and remains stable due to the presence of the floor bracket stand 1702. Ambient air is drawn into the air inlet 1206 and passes through the filter element 1204 before being exhausted out to the closed air environment 104 of FIG. 2. According to some embodiments, the floor mounted filter assembly 1700 is permanently mounted to a horizontal surface, while in other embodiments, the filter assembly 1700 is mobile and is able to be moved into a preferred position as needed. Other embodiments are possible and are not limited by this disclosure.

According to some embodiments, this disclosure includes a method of filtering air in a closed work environment that includes placing a primary air filter assembly in the closed work environment, where the primary air filter assembly includes a first air input and a first air output, and where the first air output is poised to emit once-filtered air outside the closed work environment. The method also includes placing a secondary air filter assembly in the closed work environment, where the secondary air filter assembly includes a second air input and a second air output, and repositioning the first air output to feed the second air input of the secondary air filter assembly, where the second air output is positioned to provide twice-filtered air to the closed work environment. The method also includes operating the primary air filter assembly and the secondary air filter assembly simultaneously.

In some embodiments, the method also includes where at least one of the primary air filter assembly and the secondary air filter assembly uses a high efficiency particulate air (HEPA) filter. In some embodiments, the method also includes where at least one of the primary air filter assembly and the secondary air filter assembly operates as a negative air pressure air mover. In some embodiments, the method also includes where at least one of the primary air filter assembly and the secondary air filter assembly uses a carbon air filter. In some embodiments, the method also includes where at least one of the primary air filter assembly and the secondary air filter assembly uses an air diffuser to reduce air velocity. In some embodiments, the method also includes where at least one of the primary air filter assembly and the secondary air filter assembly are positioned outside of the closed work environment.

According to some embodiments, this disclosure includes a system for filtering air in a closed work environment that includes a primary air filter assembly in the closed work environment, where the primary air filter assembly includes a first air input and a first air output, and a secondary air filter assembly in the closed work environment, where the secondary air filter assembly includes a second air input and a second air output, and where the first air output feeds the second air input of the secondary air filter assembly to provide twice-filtered air to the closed work environment.

In some embodiments, the system also includes where at least one of the primary air filter assembly and the secondary air filter assembly includes a high efficiency particulate air (HEPA) filter. In some embodiments, the system also includes where at least one of the primary air filter assembly and the secondary air filter assembly is a negative air pressure air mover. In some embodiments, the system also includes where at least one of the primary air filter assembly and the secondary air filter assembly includes a carbon air filter. In some embodiments, the system also includes where at least one of the primary air filter assembly and the secondary air filter assembly includes an air diffuser to reduce air velocity. In some embodiments, the system also includes where at least one of the primary air filter assembly and the secondary air filter assembly are positioned outside of the closed work environment.

Although the method and assembly is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and assembly, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

What is claimed is:

1. A method of filtering air in a closed work environment (102), comprising:
    placing a primary air filter assembly (108) in the closed work environment (102), wherein the primary air filter assembly (108) includes a first air input (110) and a first air output (116), wherein the first air output (116) is a negative pressure air filter assembly that is poised to emit once-filtered air;
    placing a secondary air filter assembly (200) outside the closed work environment, wherein the secondary air filter assembly (900) includes a first body (202), a second air input (204), a first hinged door (206), a plurality of wheels (208), and a screened second air output (210);
    opening the first hinged door (206);
    installing an air filter element (912) inside the first body (202);
    installing a high efficiency particulate air (HEPA) filter (914) in the first body (202) and in between the air filter element (912) and the hinged door (206);
    ensuring an air gap exists between the air filter element (912) and the HEPA filter (914);
    securing a flexible ductwork (118) to the first air output (116) and the second air input (204) so that the primary air filter assembly (108) is configured to feed the second air input (204) of the secondary air filter assembly (200), wherein the second air output (210) is positioned to provide twice-filtered air (128) to outside of the closed work environment (102);
    operating the primary air filter assembly (108) and the secondary air filter assembly (200) simultaneously; and,
    measuring via a water column gauge (512) the pressure differential between the second air input (204) and the screened second air output (210).

2. The method of claim 1, wherein at least one of the primary air filter assembly and the secondary air filter assembly operates as a negative air pressure air mover.

3. The method of claim 2, wherein at least one of the primary air filter assembly and the secondary air filter assembly uses a carbon air filter.

4. The method of claim 3, wherein at least one of the primary air filter assembly and the secondary air filter assembly uses an air diffuser to reduce air velocity.

5. A system for filtering air in a closed work environment, comprising:
    a primary air filter assembly in the closed work environment, wherein the primary air filter assembly includes a first air input and a first air output;
    a secondary air filter assembly (1200) outside the closed work environment, wherein the secondary air filter assembly (1200) includes a second air input (1206 that has a inlet fan motor assembly and a second air output (1204) including a filter element, wherein the inlet fan motor assembly is energized by using the three-speed fan switch box to control the speed of the inlet fan motor so that ambient air is drawn into the air inlet and passed through the filter element (1204) wherein the first air output feeds the second air input of the secondary air filter assembly (1200) to provide twice-filtered air to outside the closed work environment.

6. The system of claim 5, wherein at least one of the primary air filter assembly and the secondary air filter assembly includes a high efficiency particulate air (HEPA) filter.

7. The system of claim 6, wherein at least one of the primary air filter assembly and the secondary air filter assembly is a negative air pressure air mover.

8. The system of claim 7, wherein at least one of the primary air filter assembly and the secondary air filter assembly includes a carbon air filter.

9. The system of claim 8, wherein at least one of the primary air filter assembly and the secondary air filter assembly includes an air diffuser to reduce air velocity.

\* \* \* \* \*